United States Patent [19]

Imanaka

[11] Patent Number: 4,953,151
[45] Date of Patent: Aug. 28, 1990

[54] APPARATUS FOR DETECTING WHETHER INFORMATION IS RECORDED ON A STORAGE DEVICE

[75] Inventor: Ryoichi Imanaka, Hirakata, Japan

[73] Assignee: Matsushita Electric Industrial Co., Ltd., Osaka, Japan

[21] Appl. No.: 223,694

[22] Filed: Jul. 22, 1988

[30] Foreign Application Priority Data

Jul. 24, 1987 [JP] Japan .................. 62-186237

[51] Int. Cl.⁵ .................................. G11B 7/00
[52] U.S. Cl. .......................... 369/44.13; 369/54
[58] Field of Search ............ 369/44, 45, 46, 54, 369/58; 250/201 DF

[56] References Cited

U.S. PATENT DOCUMENTS

| | | | |
|---|---|---|---|
| 3,985,952 | 10/1976 | Adler | 369/44 |
| 4,118,735 | 10/1978 | Wilkinson | |
| 4,397,010 | 8/1983 | Nabeshima | 369/44 |
| 4,471,477 | 9/1984 | Bierhoff | 369/46 |
| 4,488,276 | 12/1984 | Tanaka et al. | 369/46 |
| 4,535,431 | 8/1985 | Bricot et al. | |

FOREIGN PATENT DOCUMENTS 0072723 2/1983 European Pat. Off.

Primary Examiner—Donald McElheny, Jr.
Attorney, Agent, or Firm—Lowe, Price, LeBlanc, Becker & Shur

[57] ABSTRACT

In an apparatus for detecting whether or not an information signal is recorded on a storage disk, a light beam is allowed to scan an information track of the disk. The light beam is wobbled in a direction perpendicular to a longitudinal direction of the track in response to a wobbling signal. A reproduced signal is derived from the light beam which was affected by the disk. A variation in amplitude of the reproduced signal is derived. A difference between the derived amplitude variation and the vibration signal is detected. A detection signal is generated which represents the detected difference.

8 Claims, 4 Drawing Sheets

APPARATUS FOR DETECTING WHETHER INFORMATION IS RECORDED ON A STORAGE DEVICE

BACKGROUND OF THE INVENTION

This invention relates to an apparatus for detecting whether or not information is recorded on a storage device such as an optical disk or a magnetooptical disk.

Conventional information recording and reproducing systems using optical disks are generally equipped with apparatuses for detecting whether or not information is already recorded in tracks on the disks. In such detecting apparatuses, an envelope is extracted from an output signal of an optical head which represents information in the disk track. The level of the envelope is used in determining whether or not information is already recorded in the disk track.

SUMMARY OF THE INVENTION

It is an object of this invention to provide a reliable apparatus for detecting whether or not information is recorded in a storage device such as an optical disk or a magnetooptical disk.

In a first apparatus of this invention, a light beam is allowed to scan an information track of a storage disk. The light beam is wobbled in a direction perpendicular to a longitudinal direction of the track in response to a wobbling signal. A reproduced signal is derived from the light beam which was affected by the disk. A variation in amplitude of the reproduced signal is derived. A difference between the derived amplitude variation and the wobbling signal is detected. A detection signal is generated which represents the detected difference.

In a second apparatus of this invention, a light beam is allowed to scan an information track of a storage disk. The light beam is wobbled in a direction perpendicular to a longitudinal direction of the track in response to a vibration signal. A reproduced signal is derived from the light beam which was affected by the disk. A response of the reproduced signal to the wobbling of the light beam is derived. The derived response is used in determining whether or not an information signal is recorded in the track on the basis of the derived response.

DESCRIPTION OF THE PREFERRED EMBODIMENT

Figure 1:
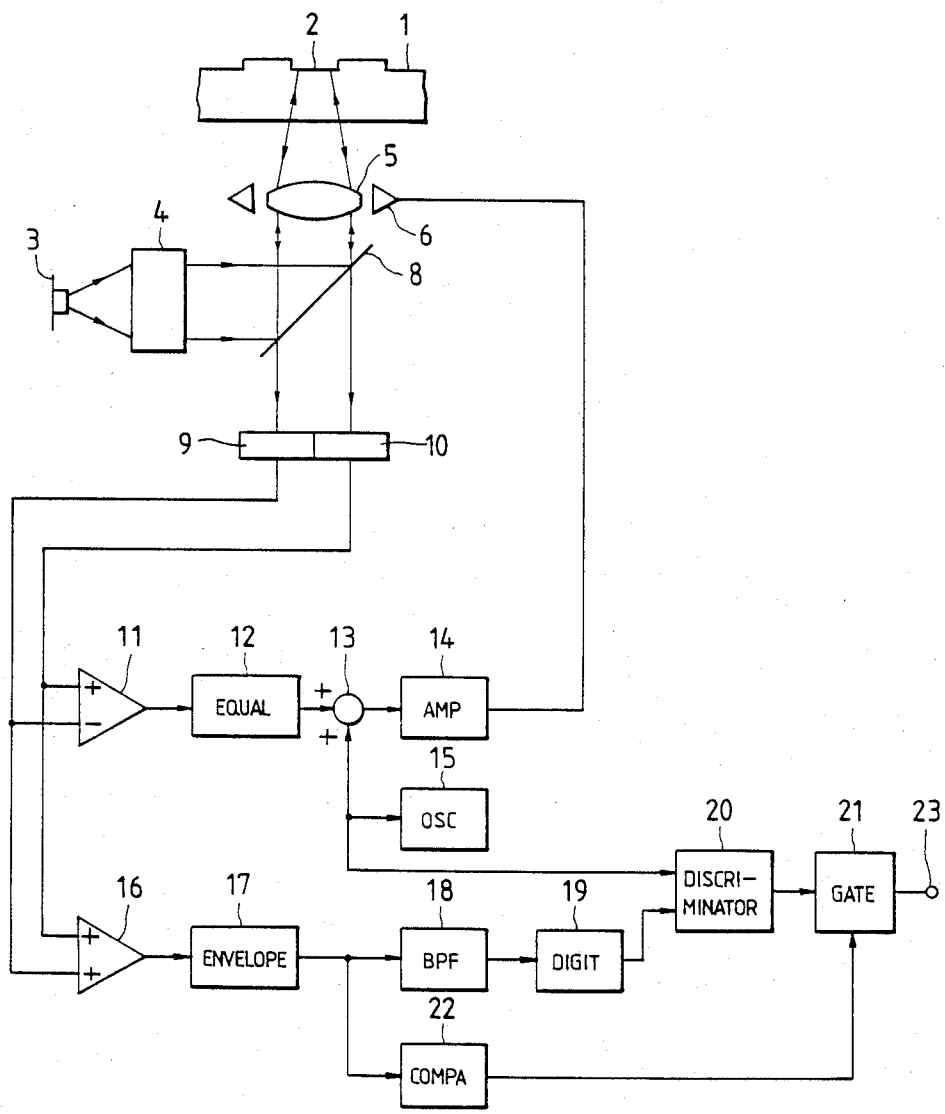
FIG. 1 is a diagram of a detecting apparatus according to an embodiment of this invention.

With reference to FIG. 1, an optical disk 1 has a spiral information track 2. The optical disk 1 is rotated by a motor (not shown). A light source 3 such as a laser emits light toward a collimator lens 4. The collimator lens 4 converts the incident light into a beam of parallel rays, which is applied to a beam splitter 8. The beam splitter 8 reflects the light beam toward an objective lens 5. The objective lens 5 focuses the light beam on the track 2 of the disk 1 and thus forms a light beam spot on the track 2. The light beam reflected by the disk 1 passes through the objective lens 5 and the beam splitter 8 and then enters separate photodetectors 9 and 10.

The photodetectors 9 and 10 output electric signals corresponding to the respective incident lights. The output signals from the photodetectors 9 and 10 are applied to respective input terminals of a differential amplifier 11. The differential amplifier 11 generates a far-field tracking error signal which corresponds to a difference between the two input signals and which represents a positional error between the track 2 and the applied light beam spot. After processed by an equalizer 12, the tracking error signal is supplied to a tracking drive device 6 via an adder 13 and an amplifier 14. The tracking drive device 6 displaces the objective lens 5 and thus moves the light beam spot in a radial direction of the track 2 in accordance with the tracking error signal so that the positional error between the track 2 and the light beam spot can be held within an allowable range. It should be noted that the radial direction of the track 2 means a direction perpendicular to a longitudinal direction of the track 2.

An oscillator 15 generates a signal having a constant frequency and a constant amplitude which is applied to the adder 13. The output signal from the oscillator 15 is superimposed by the adder 13 upon the tracking error signal. The superimposed combination of the oscillator signal and the tracking error signal are supplied to the tracking drive device 6 via the amplifier 14. The oscillator signal superimposed upon the tracking error signal vibrates or reciprocates the objective lens 5 and the light beam spot in the radial direction of the track 2 at a frequency equal to the frequency of the oscillator signal. The output signal from the oscillator 15 is also applied to a discriminator 20.

A summing amplifier 16 adds the output signals from the photodetectors 9 and 10 and thereby generates a reproduced signal representing information recorded in the track 2. An envelope detector 17 processes the reproduced signal and outputs a signal representing an envelope of the reproduced signal. A band pass filter unit 18 selects the basic spectral components of the envelope signal which have frequencies essentially equal to the frequency of the output signal from the oscillator 15 and also the second spectral components of the envelope signal which have frequencies essentially equal to twice the frequency of the output signal from the oscillator 15. A digitizing circuit 19 converts the selected components of the envelope signal into a pulse signal having a frequency essentially equal to the frequency of the oscillator signal or essentially equal to twice the frequency of the oscillator signal. The pulse signal is applied to the discriminator 20.

The discriminator 20 compares the frequency of the oscillator signal and the frequency of the pulse signal, generating a detected signal in accordance with result of the frequency comparison. The detected signal assumes a high level when the frequency of the pulse signal essentially equals twice the frequency of the oscillator signal. The detected signal assumes a low level when the frequency of the pulse signal appreciably differs from twice the frequency of the oscillator signal.

Figure 8:
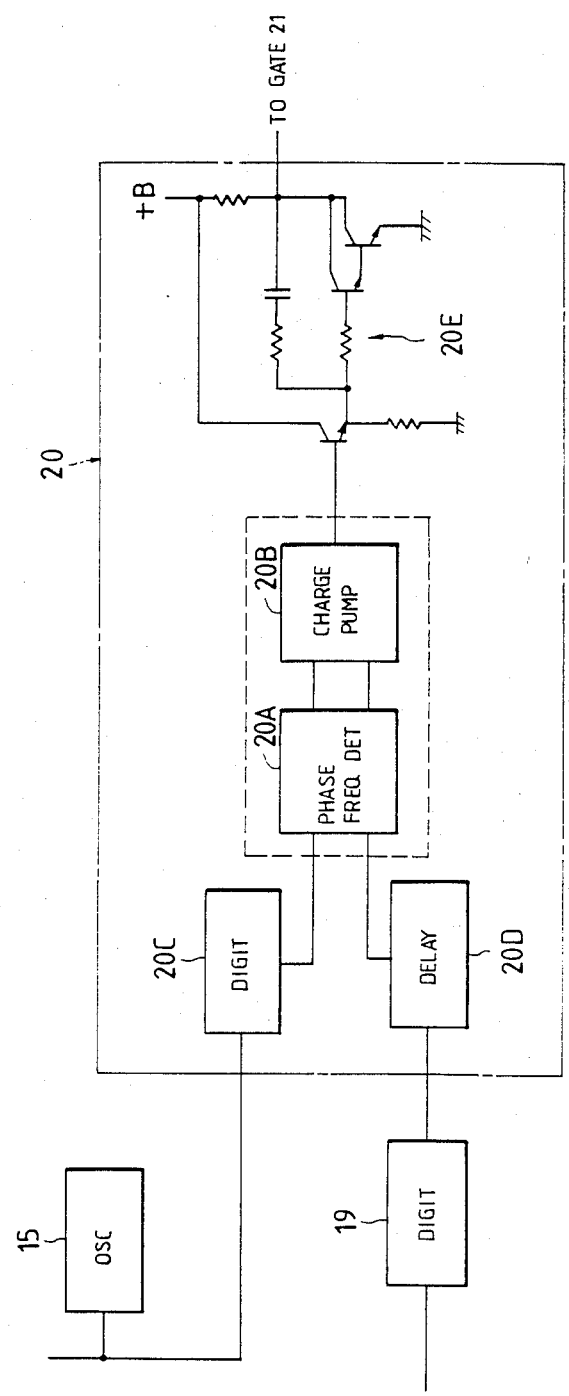
FIG. 8 is a diagram of the discriminator of FIG. 1.

As shown in FIG. 8, the discriminator 20 includes a combination of a digital phase frequency detector 20A and a charge pump 20B. For example, this combination is formed by Motorola's integrated circuit chip "MC- 4044". A digitizing circuit 20C, which is a kind of a limitter, converts the output signal from the oscillator 15 into a corresponding pulse signal which is applied to a first input terminal of the phase frequency detector 20A. The output signal from the digitizing circuit 19 is transmitted to a second input terminal of the phase frequency detector 20A via a delay circuit 20D. The output terminal of the charge pump 20B is connected to a gate 21 (see FIG. 1) via a buffer 20E. A delay time of the delay circuit 20D is chosen so that an output signal from the discriminator 20 assumes a high level when the frequency of the output signal of the digitizing circuit 19 equals twice the frequency of the output signal of the oscillator 15 and that the output signal from the discriminator 20 assumes a low level when the frequency of the output signal of the digitizing circuit 19 is equal to or lower than the frequency of the output signal of the oscillator 15.

When a gate 21 is open, the detection signal is transmitted from the discriminator 20 to an output terminal 23. When the gate 21 is closed, the transmission of the detection signal from the discriminator 20 to the output terminal 23 is inhibited. A comparator 22 responds to the amplitude or level of the output signal from the envelope detector 17 and generates a control signal applied to the gate 21. When the amplitude or level of the output signal from the envelope detector 17 exceeds a reference amplitude or level, the control signal assumes a high level, opening the gate 21. When the amplitude or level of the output signal from the envelope detector 17 does not exceed the reference amplitude or level, the control signal assumes a low level, closing the gate 21.

Figure 2:
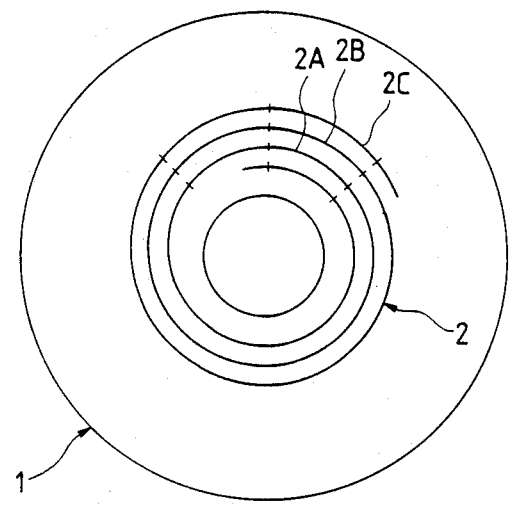
FIG. 2 is a diagram of the optical disk of FIG. 1.
Figure 3:
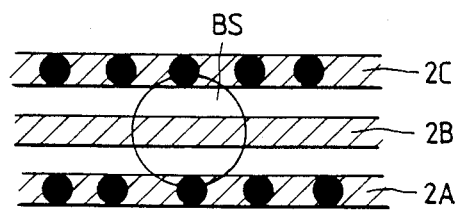
FIG. 3 is a diagram of portions of an information track in the optical disk of FIGS. 1 and 2.

As shown in FIG. 2, the spiral track 2 in the optical disk 1 is divided into sectors or portions having equal angular dimensions or equal lengths. For example, three adjacent track portions are denoted by the reference characters 2A, 2B, and 2C respectively. In some cases, the track portions are separated into two or more groups. During information recording, one group of the track portions is used at first and another group is used secondly. As shown in FIG. 3, under one example of conditions, the track portions 2A and 2C have been already used, that is, already recorded, but the intermediate track portion 2B which is being scanned by the light beam spot BS is not yet used. In FIG. 3, the black circles denote recorded information data.

In operation, the optical disk 1 rotates and the light beam spot scans portions of the information track 2 subjected to the judgement as to whether or not information is already recorded. During the rotation of the optical disk 1, the light beam spot moves along the track 2 and also wobbles in the transverse direction of the track 2. In other words, the light beam spot meanders or moves in zigzag along the track 2. The wobbling of the light beam spot in the transverse direction of the track 2 is caused by the superimposition of the oscillator signal upon the tracking error signal. The amplitude of this wobbling is determined by the amplitude of the oscillator signal. The amplitude of the wobbling is preferably about ±0.1 micrometers in the case of a normal optical disk.

Figure 4:
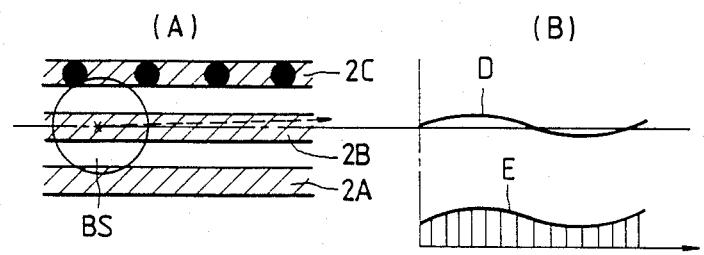
FIGS. 4–7 are diagrams showing the relationship among information track portions, displacement of a light beam spot, and a reproduced signal under respective different conditions in the apparatus of FIG. 1.

As shown in FIG. 4, in cases where the light beam spot BS is scanning the intermediate track portion 2B and where the track portion 2C is used but the track portions 2A and 2B are unused, the amplitude or envelope of the reproduced signal E outputted from the summing amplifier 16 varies at a wobbling frequency which equals the frequency of the wobbling displacement D of the light beam spot BS. It should be noted that the black circles denote recorded information data in FIG. 4. In the cases of FIG. 4, when the center of the light beam spot BS moves toward the used track portion 2C, a crosstalk from the used track portion 2C increases and thus the amplitude of the reproduced signal E also increases. When the center of the light beam spot BS moves away from the used track portion 2C, the crosstalk from the used track portion 2C decreases and thus the amplitude of the reproduced signal E also decreases. Accordingly, the frequency and the phase of the envelope of the reproduced signal E are equal to the frequency and the phase of the wobbled displacement D of the light beam spot BS.

The period of the wobbled displacement D of the light beam spot BS, that is, the period of the oscillator signal, is set adequately longer than a period of recorded signal of an information signal into the information track 2. Thus, the amplitude or envelope of the reproduced signal E is independent of the contents of the recorded information signal but is dependent on whether an information signal is present or absent in the scanned track portions and also dependent on the displacement of the light beam spot BS.

Figure 5:
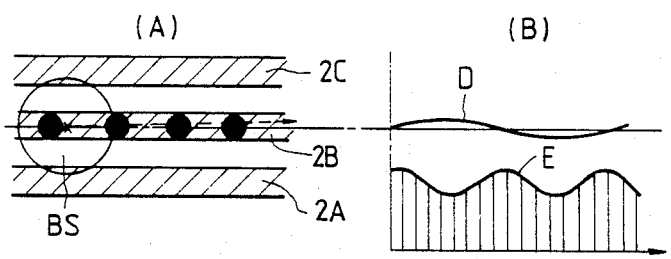

As shown in FIG. 5, in cases where the light beam spot BS is scanning the intermediate track portion 2B and where the track portion 2B is used but the track portions 2A and 2C are unused, the amplitude or envelope of the reproduced signal E outputted from the summing amplifier 16 varies at a frequency equal to twice the frequency of the wobbled displacement D of the light beam spot BS. It should be noted that the black circles denote recorded information data in FIG. 5. In the cases of FIG. 5, when the center of the light beam spot BS moves away from the central line of the track portion 2B, the amplitude of the reproduced signal E decreases. When the center of the light beam spot BS moves toward the central line of the track portion 2B, the amplitude of the reproduced signal E increases. Accordingly, the frequency of the envelope of the reproduced signal E equals twice the frequency of the wobbled displacement D of the light beam spot BS. It should be noted that, during the wobbling of the light beam spot BS, the center of the light beam spot BS periodically crosses the central line of the track portion 2B. In the cases of FIG. 5, the amplitude of the reproduced signal E is large since an information signal is recorded in the scanned track portion 2B.

Figure 6:
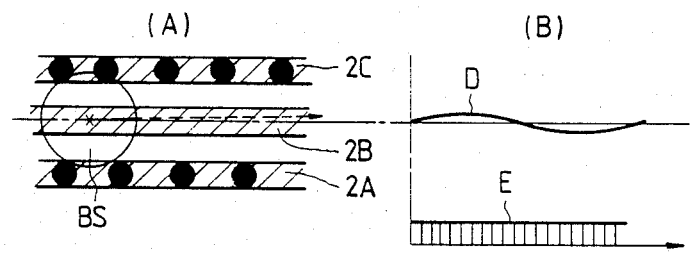

As shown in FIG. 6, in cases where the light beam spot BS is scanning the intermediate track portion 2B and where the track portions 2A and 2C are used but the track portion 2B is unused, the amplitude or envelope of the reproduced signal E outputted from the summing amplifier 16 remains essentially constant independent of the wobbled displacement D of the light beam spot BS. It should be noted that the black circles denote recorded information data in FIG. 6. In the cases of FIG. 6, a crosstalk from the used track portion 2A and a crosstalk from the used track portion 2C cancel or compensate each other, holding the amplitude of the reproduced signal E essentially constant. The constant amplitude is small since the scanned track portion 2B is unused.

Figure 7:
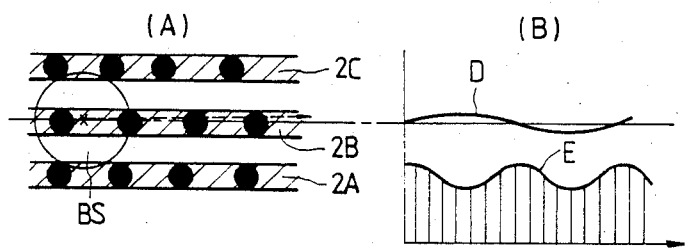

As shown in FIG. 7, in cases where the light beam spot BS is scanning the intermediate track portion 2B and where the track portions 2A, 2B, and 2C are used, the amplitude or envelope of the reproduced signal E outputted from the summing amplifier 16 varies at a frequency equal to twice the frequency of the wobbled displacement D of the light beam spot BS. It should be noted that the black circles denote recorded information data in FIG. 7. In the cases of FIG. 7, a crosstalk from the used track portion 2A and a crosstalk from the used track portion 2C cancel or compensate each other so that the amplitude of the reproduced signal E depends on only the positional relationship between the center of the light beam spot BS and the central line of the track portion 2B. Accordingly, the amplitude of the reproduced signal E varies in a manner similar to the cases of FIG. 5. In the cases of FIG. 7, the amplitude of the reproduced signal E is large since an information signal is recorded in the scanned track portion 2C.

In cases where the light beam spot BS is scanning the intermediate track portion 2B and where the track portion 2B and one of the track portions 2A and 2C are used but the other of the track portions 2A and 2C is unused, a first component of the amplitude or envelope of the reproduced signal E varies at a frequency equal to twice the frequency of the wobbled displacement D of the light beam spot BS and a second component of the amplitude or envelope of the reproduced signal E varies at a frequency and a phase equal to the frequency and the phase of the wobbled displacement D of the light beam spot BS. These cases correspond to a resultant of the cases of FIG. 4 and the cases of FIG. 5.

As understood from the previous description related to FIGS. 4-7, when an information signal has been already recorded in a track portion which is being scanned by the light beam spot, the amplitude or envelope of the reproduced signal outputted from the summing amplifier 16 varies at a frequency equal to twice the frequency of the wobbled displacement of the light beam spot, that is, equal to twice the frequency of the output signal from the oscillator 15. In addition, the amplitude of the reproduced signal is large. In this case, the envelope of the reproduced signal, which has a frequency equal to twice the frequency of the oscillator signal, causes the discriminator 20 to output a high level detection signal. In addition, the large amplitude of the reproduced signal causes the comparator 22 to output a high level control signal to the gate 21. Accordingly, the gate 21 is open so that the high level detection signal is allowed to travel to the output terminal 23.

When an information signal is not yet recorded in a track portion which is being scanned by the light beam spot, the amplitude of the reproduced signal remains at a small constant level or varies at a frequency equal to the frequency of the output signal from the oscillator 15. In the case where the amplitude of the reproduced signal remains at a small constant level, the comparator 22 outputs a low level control signal and thus the gate 21 is closed so that the output terminal 23 remains at a low potential or a low level independent of the detection signal outputted from the discriminator 20. In the case where the amplitude of the reproduced signal varies at a frequency equal to the frequency of the oscillator signal, the discriminator 20 outputs a low level detection signal so that the output terminal 23 remains at a low potential or a low level regardless of whether or not the gate 21 is open.

It is preferable that the frequency of the output signal from the oscillator 15 is considerably higher than a frequency at which the light beam spot passes through track sectors or portions sequentially. In addition, the frequency of the oscillator signal preferably resides out of a band of frequencies used in the tracking servo control. This frequency choice allows the objective lens 5 to vibrate easily.

It should be noted that various modifications may be made in this embodiment. For example, the discriminator 20 may be displaced by a phase comparator sensing a difference in phase between the oscillator signal and the pulse signal. In addition, the optical disk 1 may be replaced by a magnetooptical disk.

What is claimed is:

1. An apparatus for detecting whether or not an information signal is recorded on a storage disk, the apparatus comprising:
   (a) means for scanning an information track of the disk with a light beam;
   (b) means for wobbling the light beam in a direction perpendicular to a longitudinal direction of the track in response to a wobbling signal;
   (c) means for deriving a reproduced signal from the light beam which was affected by the disk;
   (d) means for deriving a variation in amplitude of the reproduced signal; and
   (e) means for detecting a difference between the derived amplitude variation and the wobbling signal and generating a detection signal representative of the detected difference indicative of the presence of said information signal being recorded on said storage disk.

2. The apparatus of claim 1 further comprising means for detecting whether or not the amplitude of the reproduced signal exceeds a reference level and generating an amplitude signal representative thereof, and means for generating a judgement signal in accordance with the detection signal and the amplitude signal, the judgement signal representing whether or not an information signal is recorded in the track.

3. The apparatus of claim 1 wherein the detecting means is operative to determine whether or not a frequency of the amplitude variation equals twice a frequency of the wobbling signal.

4. An apparatus for detecting whether or not an information signal is recorded on a storage disk, the apparatus comprising:
   (a) means for scanning an information track of the disk with a light beam;
   (b) means for wobbling the light beam in a direction perpendicular to a longitudinal direction of the track in response to a wobbling signal;
   (c) means for deriving a reproduced signal from the light beam which was affected by the disk;
   (d) means for deriving a response of the reproduced signal to the wobbling of the light beam; and
   (e) means for determining whether or not an information signal is recorded in the track on the basis of the derived response.

5. An apparatus for detecting whether or not an information signal is recorded on a storage disk, the apparatus comprising:
   (a) means for scanning an information track of the disk with a light beam;
   (b) means for detecting a tracking error between the light beam and the track and generating a tracking error signal representative thereof;
   (c) means for controlling the light beam in accordance with the tracking error signal;
   (d) means for modulating the tracking error signal;
   (e) means for deriving a reproduced signal from the light beam which was affected by the disk;

(f) means for deriving a response of the reproduced signal to the modulation of the tracking error signal; and (g) means for determining whether or not an information signal is recorded in the track on the basis of the derived response.

6. An apparatus for detecting the presence of an information signal recorded on a storage disk, the apparatus comprising:

(a) optical scanning means for scanning an information track of the disk with a light beam;

(b) dithering means for generating a wobbling signal and wobbling the light beam in a direction perpendicular to a longitudinal direction of the track in response to said wobbling signal;

(c) first detector means for deriving a reproduced signal from the light beam which was affected by the disk;

(d) second detector means including an envelope detector receiving said reproduced signal from said first detector means and, in response, deriving a variation in amplitude of the reproduced signal and supplying an envelope signal representative thereof; and (e) discriminator means receiving said wobbling signal from said dithering means and said envelope signal from said second detector means and, in response, detecting a difference between the derived amplitude variation and the wobbling signal and generating a detection signal representative of the detected difference indicative of the presence of said information signal being recorded on said storage disk.

7. The apparatus of claim 6 further comprising comparator means receiving said envelope signal from said second detector for detecting whether or not the amplitude of the reproduced signal exceeds a reference level and generating an amplitude signal representative thereof, and gate means receiving said detection signal from said discriminator means and said amplitude signal from said comparator means and, in response, generating a judgement signal in accordance with the detection signal and the amplitude signal, the judgement signal representing whether or not an information signal is recorded in the track.

8. The apparatus of claim 6 wherein the discriminator means is operative to determine whether or not a frequency of the amplitude variation equals twice a frequency of the wobbling signal.

* * * * *